Figure 1:
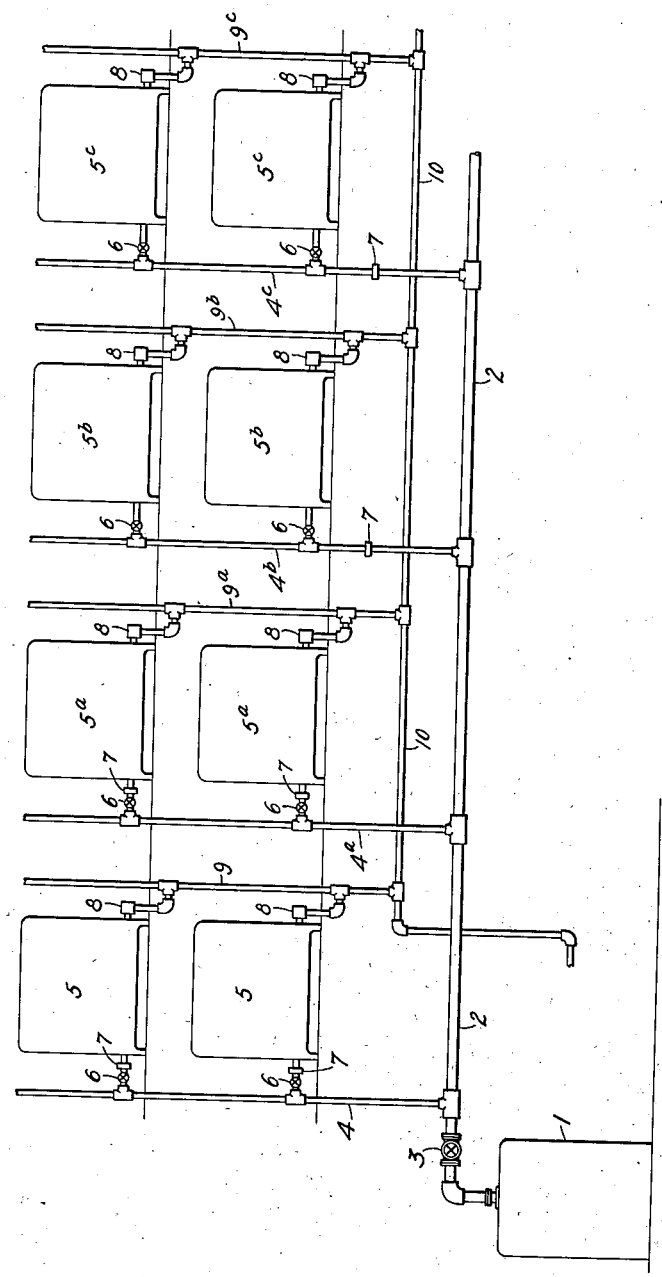

Dec. 1, 1936.   H. J. C. WELLS   2,062,341
HEATING SYSTEM
Filed Aug. 25, 1934   2 Sheets-Sheet 1

INVENTOR
Herbert J. Clement Wells
BY Lawrence K. Sager
his ATTORNEY

Dec. 1, 1936. H. J. C. WELLS 2,062,341
HEATING SYSTEM
Filed Aug. 25, 1934 2 Sheets-Sheet 2
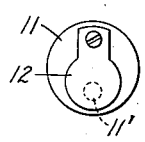
FIG. 2
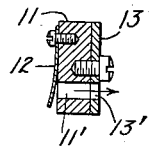
FIG. 3
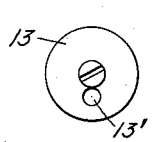
FIG. 4
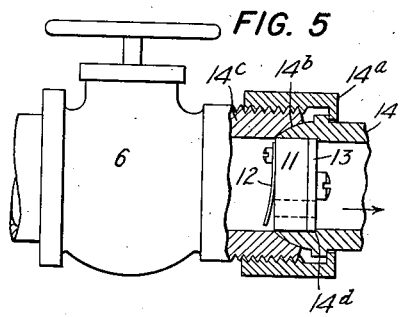
FIG. 5
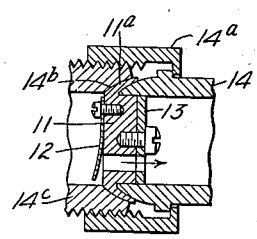
FIG. 6
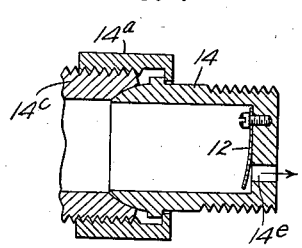
FIG. 7
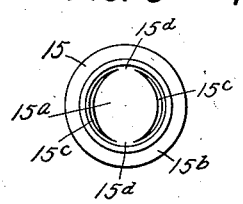
FIG. 8
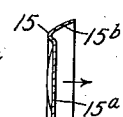
FIG. 9
FIG. 10
FIG. 11
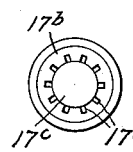
FIG. 12
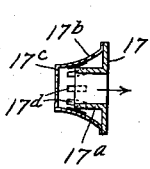
FIG. 13
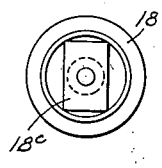
FIG. 14
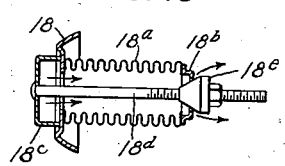
FIG. 15
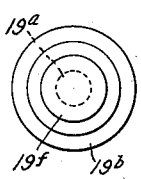
FIG. 16
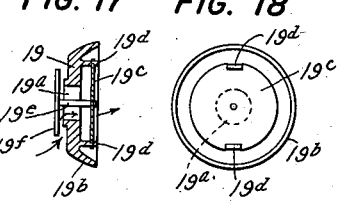
FIG. 17
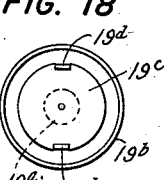
FIG. 18
INVENTOR
Herbert J. Clement Wells
BY Lawrence K. Sager
his ATTORNEY Patented Dec. 1, 1936

2,062,341

UNITED STATES PATENT OFFICE 2,062,341

HEATING SYSTEM

Herbert J. Clement Wells, Jackson Heights, N. Y.

Application August 25, 1934, Serial No. 741,395

3 Claims. (Cl. 237—9)

This invention relates to automatic and graduated control of the distribution of the heating medium in heating systems to the individual heating elements, or to different groups of heating elements, in limited amounts regardless of changes imposed upon the heating system. The improvement comprises the combination in the system, of automatic graduating valves which insure and restrict the distribution of the heating medium to limited amounts according to the particular requirements.

In my pending application, Serial No. 736,507 filed July 23, 1934, I have disclosed and claimed generally a heating system wherein my improved graduating valves are used for distribution purposes and particularly where the distribution of the heating medium is made in proportion to change of the heating requirements, as in response to change of outside temperature, or the temperature changes at a key location. By the present invention, the distribution of the heating medium is restricted to constant or predetermined amounts regardless of variations of pressure of the source of supply or any other changes to which the system may be subjected.

Conditions exist in particular cases where by contract, or by desire, a limited constant amount of steam is to be supplied per heating element, or per group of heating elements; and any changes imposed upon the system are not to affect this fixed constant supply of steam. These changes might be due to pressure variations during the continued use of the heating medium; there are also cases where the heat supply is cut off during certain periods and then resupplied intermittently. During the resupply periods, the radiators near the source, when provided with fixed inlet openings, rob the more distant radiators of their required proper supply of the heating medium until after a considerable heating up period of the radiators and areas heated thereby, near the source.

By the present invention, the graduated control of the heating medium limits the distribution to fixed amounts to all radiators, and the heat distribution is made uniform and constant to all the heating elements simultaneously, not only during the warming up periods but during continued periods of heat supply regardless of the changes to which the system may be subjected. These results are accomplished by the incorporation with the system, of simple graduating distribution valves, or graduators, which are dependable under long continued use and which are economical in the distribution of the heating medium by limiting the amount supplied to the determined uniform amount at all times.

The invention will be understood from the following description and accompanying drawings wherein Figure 1 is a diagram illustrating a heating system embodying the invention; Fig. 2 is a face view of one form of graduating valve; Fig. 3 is a vertical section thereof; Fig. 4 is a rear elevation thereof; Fig. 5 is a side view partly in section of the usual manual radiator inlet valve having incorporated therewith the graduating valve of Figs. 2 to 4; Fig. 6 is a similar view showing a different way of supporting the graduating valve; Fig. 7 is a vertical section showing the graduating valve combined with the nipple of the union; Fig. 8 is a face view of another form of graduating valve and Fig. 9 is a vertical section thereof; Fig. 10 is a face view of another form of graduating valve and Fig. 11 a side view thereof; Fig. 12 is a face view of still another form of graduator and Fig. 13 a vertical section thereof; Fig. 14 is a face view of a form of graduator of the bellows type and Fig. 15 a vertical section thereof; Fig. 16 is a face view of still another form of graduator, Fig. 17 a vertical section thereof and Fig. 18 an end view thereof.

In Fig. 1 a typical heating system is indicated with my improved graduating valves combined therewith. The boiler 1 supplies steam to a main supply pipe 2 through the usual hand valve 3. A riser 4 supplies a plurality of heating elements or radiators 5, two of such radiators being indicated. The connection to each radiator is shown as including the usual hand stop valve 6 and is also provided in each inlet connection with a graduating valve of this invention indicated as inserted at 7 at the outlet end of the hand valve 6. The usual steam trap 8 is connected in the outlet of each radiator, the return 9 being connected to the common return 10. Similarly a riser 4a supplies a group of radiators 5a through the graduating valves 7 to each radiator, the return 9a being connected to the common return 10.

Another group of radiators 5b is supplied from a riser 4b and likewise an additional group 5c is indicated supplied by the riser 4c, the returns 9b and 9c being connected to the common return. The radiators of groups 5b and 5c are not shown as supplied with individual graduating valves but these valves 7 are inserted in the supply pipe 4b and 4c to each group respectively as shown.

By incorporating the graduating distribution valves into the system as shown, one in each radiator inlet, or in the inlet to each group of radiators, the amount of the heatng medum delivered to the individual radiators, is respectively controlled so that each radiator, or each group, will receive respectively the limited amount intended or required at all times, regardless of changes in the pressure of the source or other changes to which the system may be subjected.

Figs. 2 to 5 show one preferred form of the graduating valve adapted to be inserted at the locations 7 of Fig. 1. The valve is shown as formed of a circular disc 11 having an opening 11' at one side of the center of the disc. A flexible thin sheet of metal 12 forms the movable element of the valve and is secured at one end to the disc 11 and has an enlarged portion which extends over the opening 11'. The disc 11 is preferably made of brass or similar material and the flexible element 12 is preferably made of "Monel metal" or bronze or similar material which will not materially oxidize under normal use and also has proper flexibility for securing the desired control. The flexible element 12 is given an initial set so as to uncover the opening 11' sufficiently, at low steam pressure, to permit the full required amount of steam to be supplied to the radiators, or group of radiators. Initial adjustment of the opening 11' is conveniently made by a thin brass disc 13 mounted by a central screw on the opposite side of the disc 11 from the flexible element 12. The disc 13 has an opening 13' of the same size as the opening 11'. Where the heating medium required to be delivered through the valve is lower than that permissibly attainable through the opening 11', under conditions of low steam pressure, the disc 13 may be adjusted by loosening the central holding screw and turning the disc 13 so as to partially close the opening 11' to the desired amount and then tightened in its adjusted position. The flexible element 12 is located on the side of the disc 11 towards the incoming steam so that increase in pressure and dynamic pressure of the steam against the flexible element 12 of the valve will tend to close the opening 11' to a corresponding decreased amount.

Fig. 5 shows how the graduating valve, or graduator, is conveniently mounted in the inlet to the radiator at the union 7 between the hand valve 6 and the radiator. The pipe or nipple 14 is connected directly to the radiator and the usual internally threaded coupling nut is shown at 14a drawing the parts together to make a tight fit between the engaging surfaces 14b of the end of the nipple 14 and the threaded extension 14c of the hand valve. For the purpose of receiving the graduating valve, the interior of the outer end of the nipple 14 may be slightly cut away so as to form a shoulder 14d. The graduating valve may then be seated against this shoulder and nicely fitted within the opening at the end of the nipple 14, as shown in Fig. 5. It thus occupies a small space and avoids the necessity of providing extra fittings or connections.

Fig. 6 shows another form of this graduator adapted for mounting in a different manner in the inlet. Here the disc 11 is provided with an outwardly extending curved flange 11a adapted to fit and be clamped between the curved engaging portion of the union at the joint 14b. The graduator is thus conveniently mounted and held in fixed position without the necessity of machining the interior of the nipple 14. Fig. 7 shows a graduating valve as forming a part of the nipple 14 of the union. Here the nipple is closed at the inner end except for an opening 14e controlled by the flexible element 12 mounted upon the inner face of the end of the nipple.

In some cases the hand valve 6 may be omitted entirely. Also, the graduating valve may obviously be placed in the intake side of the hand valve instead of in the outlet side. Where the graduators are mounted in the supply pipe to two or more radiators, as shown in the right hand portion of Fig. 1, the graduating valve may be mounted conveniently in the union at the location 7 in a manner similar to that already described when mounted in the union at the hand valve.

The direction of flow of the heating medium through the graduating valve is such that increase in pressure and dynamic pressure of the steam against the flexible element of the valve tends to close the graduating valve, as indicated by the arrows in Figs. 3, 5, 6 and 7. At low steam supply pressures and low dynamic pressure of the steam against the valve, the flexible element 12 is away from the opening 11' to approximately its maximum amount and thus permits the full required amount of the heating medium to pass through the valve and thus enables each radiator, or group of radiators, to receive their respective full amounts of the heating medium. Upon any increase of the steam pressure and of the dynamic pressure of the steam against the valve, the element 12 is correspondingly moved closer to the opening 11' with the result that an approximately constant amount of steam is delivered to the radiators, or groups of radiators, under any conditions to which the system may be subjected, thus giving all the heating elements of the system a uniform constant supply of heating medium at all times. In accomplishing this result the flexible element will be proportioned as to thickness and as to size of its reduced neck portion, and as to quality of material as regards flexibility and its initial setting in well understood ways. In addition to maintaining a constant uniform distribution of the amount of the heating medium to the heating elements under continuous operating conditions, the invention is also particularly advantageous in those instances where the steam supply is shut down during certain periods and then turned on at certain times with full steam pressure. When the full steam pressure is thus supplied, the radiators near the source receive only their regular limited amount of steam owing to the graduators being forced near their closed position. Thus the steam supply can readily and promptly pass on to the more distant radiators to supply them. Thus a uniform and simultaneous distribution of the steam is made to all parts of the system during the initial warming up period, as distinguished from the condition of using fixed openings to the radiators and allowing the radiators near the source to rob the more distant radiators of their prompt supply of steam.

Various forms of graduators may be used. In Figs. 8 and 9, the valve is formed of a single circular piece 15 of thin flexible metal. It has a flat circular portion 15a with a flared peripheral portion 15b. The central portion has near its outer part two circular slots 15c leaving two opposite uncut portions 15d. The two sides of the central part 15a thus form yieldable wings. These wings are bent to have an initial set against the path of the steam so that the higher the static pressure and dynamic pressure of the steam, the more the graduator will tend to close.

Figs. 10 and 11 show another form of graduating valve formed of a single circular piece 16 of thin flexible metal. It is cut from the center outwardly to form a number of sectors 16a; but the cuts do not extend to the rim. These sectors are bent to have an initial setting against the direction of the steam flow, as indicated in Fig. 11, so that any increase in static pressure and dynamic pressure of the steam supply will cause the sectors to move inwardly to reduce the opening through the valve.

In Figs. 12 and 13 the valve is formed of a rigid part having a disc portion 17 with a central tubular extension 17a. A flexible portion 17b is fixed to the disc 17 near the periphery and is flared inwardly to form a central tubular portion 17c surrounding the tube 17a. The tube 17c is closed at its outer end and is provided in its tubular portion with a series of longitudinally extending slots 17d. The valve is inserted in the inlet pipe in such a way that increased static pressure and dynamic pressure of the steam will tend to force the tube 17c axially more and more towards the tube 17a, as indicated in Fig. 13. Thus the openings 17d are gradually decreased with increase of steam pressure so that only a limited amount of steam is delivered to the heating element, or groups of elements, under all conditions.

Figs. 14 and 15 show a form of graduating valve of the bellows type. One part 18 has a flared circular portion for supporting the unit in the joint of the union when so desired. On its inner side is mounted one end of a corrugated tubular bellows 18a. The other end carries a ring 18b to form the movable seat of the valve. On the opposite side of the part 18 is mounted a bridge-piece 18c. This supports an inwardly extending central rod 18d which carries a cone-shaped element 18e forming the valve element which cooperates with the ring 18b. This cone is threaded on the rod 18d for initial adjustment. The ingoing steam passes around the sides of the bridge 18c to the interior of the bellows and then to the heating element around the sides of the cone 18e. Any change in static pressure and dynamic pressure of the steam against the ring 18b will extend the bellows more or less and correspondingly limit the amount of steam supplied to the radiators, or groups of radiators, to a desired amount.

Figs. 16 to 18 show a graduating valve with a central supporting part 19 having a central opening 19a and a flared flange 19b for clamping in place at the joint of the union. A flexible disc 19c is supported at diametrically opposite points by posts 19d on the part 19 on the outgoing side of the valve. At the center of the disc 19c is supported a pin 19e which passes centrally through the opening 19a and supports the movable valve element 19f at its outer end which element covers the outer end of the opening 19a. Under changing conditions of the steam supply, the flexible element 19c yields accordingly to move the element 19f to a greater or lesser extent toward its seat against the element 19, thereby limiting the steam supplied to the heating elements to the fixed required amounts at all times.

Many other forms of graduating valves may obviously be used; and it will be understood that various modifications and adaptations of the heating system and various different combinations and relationships may be developed for particular cases without departing from the scope of the invention.

I claim:

1. In a heating system comprising a plurality of heating elements, and inlet valves located in the supply pipes leading to said heating elements, each of said valves having an opening therethrough and a flexible element adjoining said opening and in the path of the ingoing heating medium and subjected to the dynamic pressure of the ingoing heating medium for closing said opening to a greater degree the more said dynamic pressure increases.

2. In a heating system comprising a plurality of heating elements, and inlet valves located in the supply pipes leading to said heating elements, each of said valves comprising a fixed element having an opening and a flexible element of sheet metal form opposite said opening and in the path of the ingoing heating medium and subjected to the dynamic pressure of the ingoing heating medium for closing said opening to a greater degree the more said dynamic pressure increases.

3. In a heating system comprising a plurality of heating elements, and inlet valves located in the supply pipes leading to said heating elements, each of said valves comprising a fixed element having an opening and a flexible element of sheet metal form opposite said opening and in the path of the ingoing heating medium and subjected to the dynamic pressure of the ingoing heating medium for closing said opening to a greater degree the more said dynamic pressure increases, and means for adjusting the size of the opening of said fixed element.

HERBERT J. CLEMENT WELLS.